US007786865B2

(12) United States Patent
Park

(10) Patent No.: US 7,786,865 B2
(45) Date of Patent: Aug. 31, 2010

(54) RFID READER AND RANGE INDICATING METHOD FOR THE RFID READER

(75) Inventor: Eric Park, Mississauga (CA)

(73) Assignee: Psion Teklogix Inc., Ontario (CA)

(*) Notice: Subject to any disclaimer, the term of this patent is extended or adjusted under 35 U.S.C. 154(b) by 953 days.

(21) Appl. No.: 11/466,596

(22) Filed: Aug. 23, 2006

(65) Prior Publication Data

US 2008/0061937 A1  Mar. 13, 2008

(51) Int. Cl.
*G08B 13/14* (2006.01)
(52) U.S. Cl. .............................. 340/572.1; 340/825.36; 340/825.49
(58) Field of Classification Search .................. 340/825
See application file for complete search history.

(56) References Cited

U.S. PATENT DOCUMENTS 6,335,685 B1 * 1/2002 Schrott et al. ............ 340/572.1

| 7,199,719 | B2 * | 4/2007 | Steinberg | 340/572.8 |
| 7,392,951 | B2 * | 7/2008 | Ray et al. | 235/462.2 |
| 7,405,662 | B2 * | 7/2008 | Steinke et al. | 340/572.4 |
| 2005/0030160 | A1 | 2/2005 | Goren et al. | |
| 2006/0170565 | A1 | 8/2006 | Husak et al. | |

OTHER PUBLICATIONS

Canadian Intellectual Property Office, First Office Action dated Jan. 27, 2009, 4 pages.

* cited by examiner

*Primary Examiner*—Benjamin C Lee
*Assistant Examiner*—Curtis J King
(74) *Attorney, Agent, or Firm*—Stephen B. Salai, Esq.; Brian B. Shaw, Esq.; Harter Secrest & Emery LLP

(57) ABSTRACT

An RFID reader and range indicating method for the RFID reader is provided. The RFID reader includes an RF antenna for communicating with one or more than one tag using RF signals, a module for operating on the tag, a module for analyzing a range of the RFID reader; and a module for indicating, based on the analysis, a potential area where the RFID reader is capable of implementing the operation on the tag.

28 Claims, 5 Drawing Sheets

RFID READER AND RANGE INDICATING METHOD FOR THE RFID READER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING

Not Applicable

FIELD OF INVENTION

The present invention relates to Radio Frequency Identification (RFID) technology and more specifically to the range of an RFID reader.

BACKGROUND OF THE INVENTION

An RFID reader can read RFID tags that are within a particular range of the RFID reader. This range is generally a function of the RFID reader and more particularly a function of the capabilities of the reader's antenna. Further there may be occasions where the read range changes during operation of the reader for reasons that may include the provision of reduced power to the antenna due to the power remaining in the reader's battery. The read range of an RFID reader is also influenced by the "field of view" of the reader.

In current systems a user of an RFID reader must have historical knowledge of the reader's capability in order to guesstimate whether a particular tag, which may be present in a container, can be read. This process is inherently unpredictable as the user estimates the location of the tag and compares this to the knowledge of the reader's range. This unpredictability may lead to false negatives in the reading process where tags that are in fact present yet out of range of the reader are falsely determined as not being present. Further, any change in the range of the reader during operation will add to the unpredictability of the above process.

The operation of a typical RFID system is schematically illustrated in FIG. 1. An RFID reader 102 has an internal antenna (not shown) that allows the RFID reader 102 to provide an envelope 106 of RFID coverage associated with an antenna of the RFID reader 102. The envelope 106 represents the boundary of the RFID coverage. The shape of the envelope 106 is representational only and does not necessarily reflect the actual shape of the RFID coverage of the RFID reader 102. A first group of RFID tags 108 is present within the envelope 106, and will therefore be read by the RFID reader 102. Groups of tags 110 and 112 may possibly physically be located quite close to the group 108. However, if the groups 110 and 112 are located outside the envelope 106, they will not be read by the RFID reader 102. Thus without knowledge of the coverage of the RFID reader 102, the user may falsely determine that the tags 110 and 112 are not present.

BRIEF SUMMARY OF THE INVENTION

It is an object of the invention to provide a method and system that obviates or mitigates at least one of the disadvantages of existing systems.

In accordance with an aspect of the present invention, there is provided an RFID reader, which includes an RF antenna for communicating with one or more than one tag using RF signals, a module for operating on the tag, a module for analyzing a range of the RFID reader, and a module for indicating based on the analysis a potential area where the RFID reader is capable of implementing the operation on the tag.

In accordance with a further aspect of the present invention, there is provided a method for an RFID reader. The RFID reader includes an RF antenna for communicating with one or more than one tag using RF signals and a module for operating on the tag. The method includes the steps of analyzing a range of the RFID reader, and indicating based on the analysis a potential area where the RFID reader is capable of implementing the operation on the tag.

This summary of the invention does not necessarily describe all features of the invention.

BRIEF DESCRIPTION OF THE SEVERAL VIEWS OF THE DRAWINGS

These and other features of the invention will become more apparent from the following description in which reference is made to the appended drawings wherein.

DETAILED DESCRIPTION OF THE INVENTION

Figure 1:
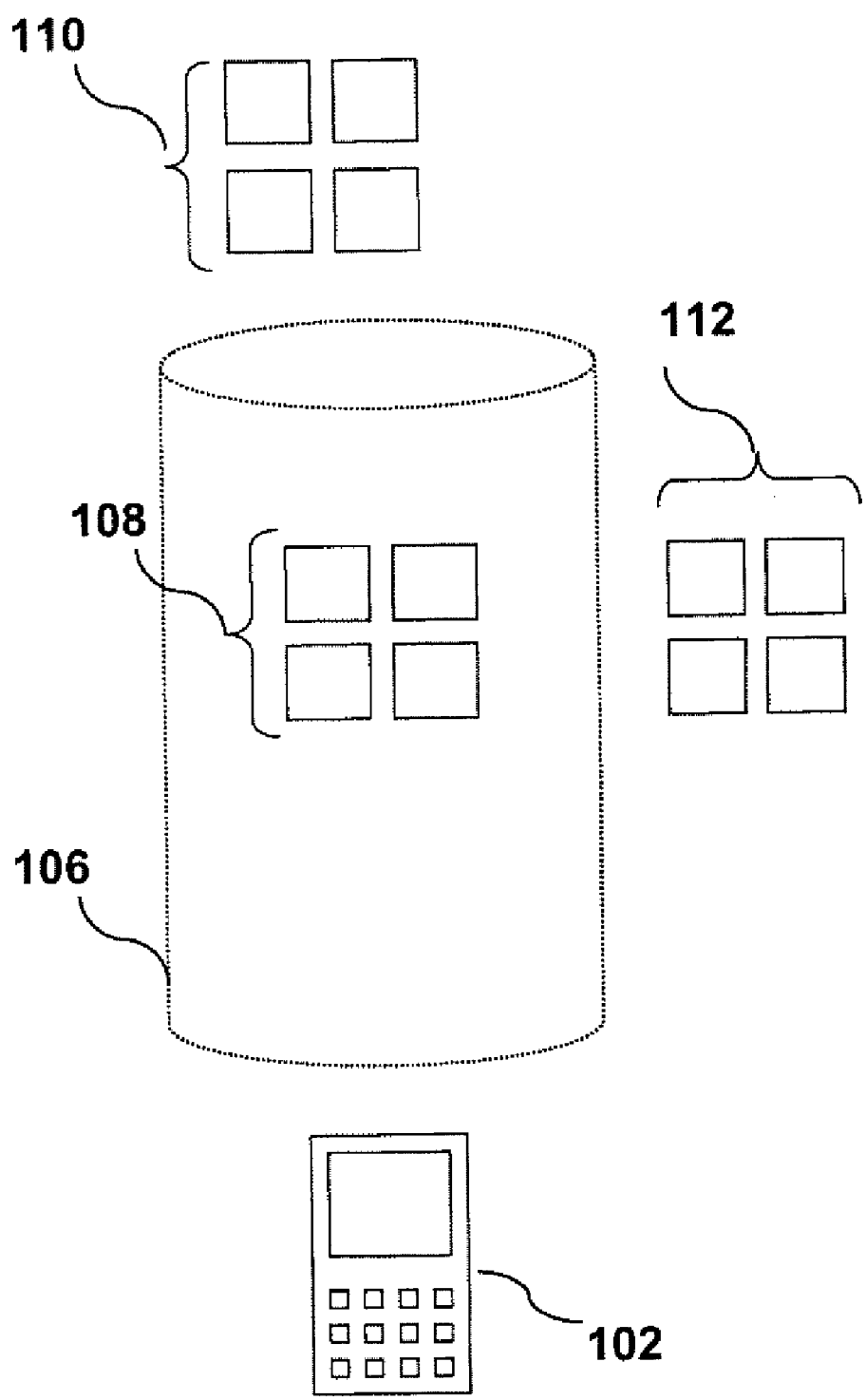
FIG. 1 is a schematic diagram illustrating the operation of a typical RFID reader.
Figure 2:
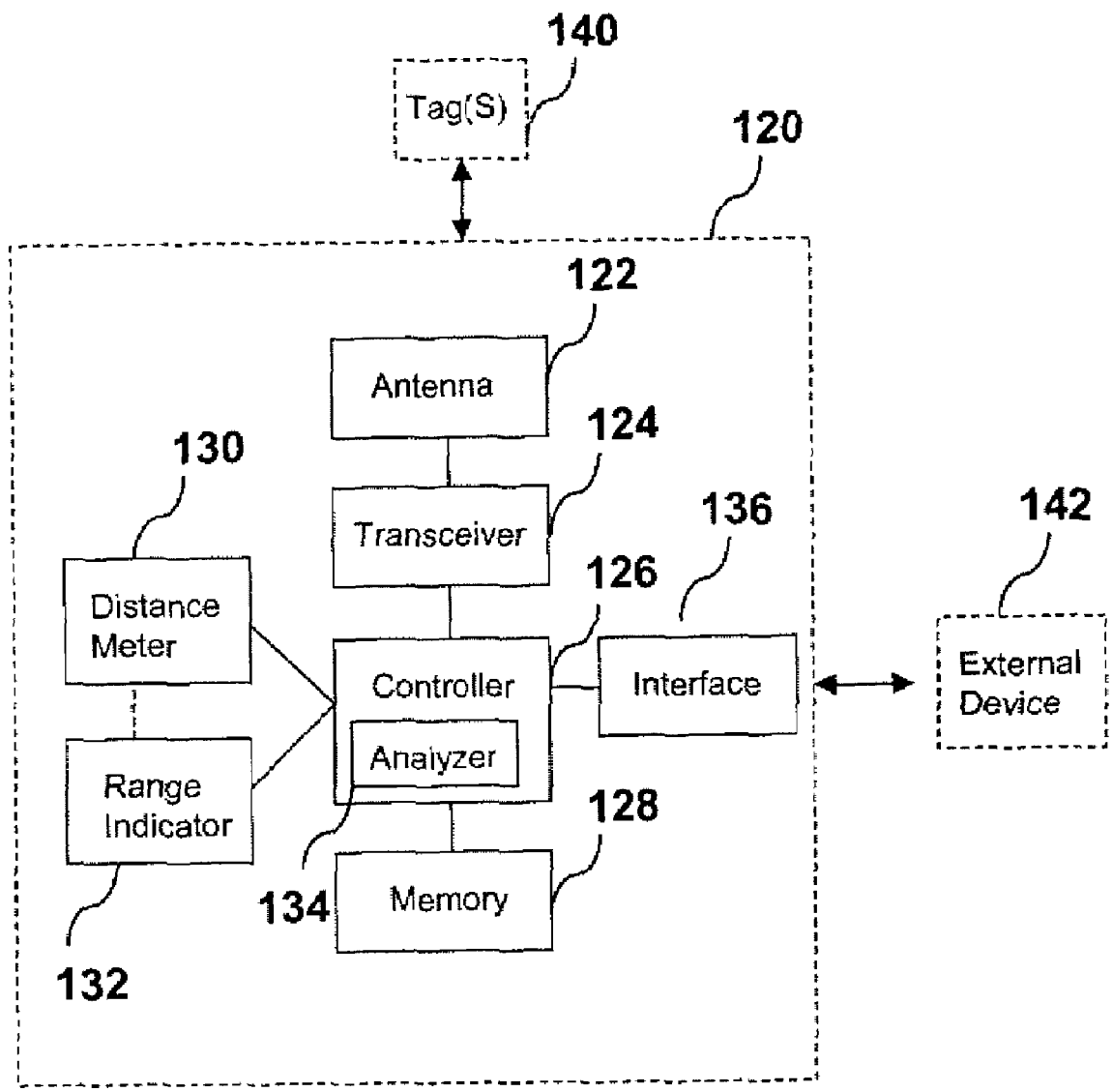
FIG. 2 is a schematic diagram illustrating an example of an RFID reader in accordance with an embodiment of the present invention.

FIG. 2 illustrates an example of an RFID reader in accordance with an embodiment of the present invention. The RFID reader 120 of FIG. 2 includes an RFID tag antenna system 122 ("Antenna" in FIG. 2) and transceiver 124 for communicating with tags 140. The RFID reader 120 may be a portal reader or a handheld reader unit. The RFID reader 120 may have functionality of writing information on the tags 140. The tags 140 may be read-only tags or read-write tags. The RFID tag antenna system 122 may include a directional antenna, an array antenna or an omni-directional antenna for RF signals. In the description, "RFID tag antenna system" and "antenna" may be used interchangeably.

The RFID reader 120 includes a controller 126 for operating the RFID reader 120 and a memory 128 coupled to the controller 126. The RFID reader 120 further includes a distance meter 130 and a range indicator 132. The distance meter 130 and the range indicator 132 with the controller 126 provide to a user a visual indicator for indicating a potential area where the RFID reader 120 is capable of implementing proper operation (e.g., interrogation, read, write) on tags. The distance meter 130 and the range indicator 132 communicate with the controller 126. However, the distance meter 130 and the range indicator 132 may communicate with each other directly.

The controller 126 is coupled to the transceiver 124 and the memory 128. The controller 126 includes one or more than one logic processing unit, which may include, but not limited to, one or more central processing units (CPUs), digital signal processors (DSPs), application-specific integrated circuits (ASIC), or combinations thereof.

The memory 128 includes a random access memory (RAM) and a read-only memory (ROM). The memory 128 includes instructions and data for initializing and operating the RFID reader 120, such as, communication with the tags 140, reading data from the tags 140, writing data on the tags 140, communication with an external device 142, and the operation of the distance meter 130 and the range indicator 132. The memory 128 may include flash memory, erasable programmable read-only memory (EROPM), electronically erasable programmable read-only memory (EEPROM), or combinations thereof.

The RFID reader 120 may include an interface 136 for communicating with the external device 142 other than tags, such as a computer system, in a wireless or wired network. The external device 142 may include, for example, a display for displaying visual information on a screen.

In FIG. 2, all elements in the RFID reader 120 are illustrated separately. However, some or all of these blocks can be monolithically integrated onto a single chip.

The visual indicator is described in detail. The visual indicator provides to the user an indication that a candidate object (s) is partially or entirely within the coverage area of the antenna 122. Based on the visual indicator, the user can determine that the RFID reader 102 is appropriately positioned to operate on possible tags in the candidate object. The candidate object may be a container or a box and possibly contain tags. In the description, the terms "candidate object" and "target object" are used interchangeably.

The visual indicator is a multi-dimensional illumination. The multi-dimensional illumination may have, but not limited to, a rectangular shape pattern, a circular shape pattern, or an oval shape pattern. The dimension of the visual indicator at a distance from the RFID reader 120 is associated with the coverage area of the antenna 122 at that distance.

The distance meter 130 measures a distance between the RFID reader 120 and the candidate object. The distance meter 130 may measure a straight-line distance between the RFID reader 120 and the candidate object. The distance meter 130 may be an electronic distance meter, an electromagnetic distance meter, an optical distance meter or a laser distance meter. The distance meter 130 may repeatedly measure the distance between the RFID reader 120 and the candidate object and calculate the most possible distance.

The result of the distance measurement is provided to the controller 126. The controller 126 includes an analyzer 134 for analyzing the measured distance and the range of the RFID reader 120. The analyzer 134 may analyze the range of the RFID reader 120 in parallel to the distance measurement or separately from the distance measurement.

The analyzer 134 determines whether the candidate object is within the range of the RFID reader 120. The analyzer 134 determines one or more than one dimension of the visual indicator on the candidate object (i.e., the dimensions of an illuminated area on the candidate object). The dimensions of the visual indicator are associated with the dimensions of the potential area on the candidate object.

For example, when the RFID reader 120 uses a rectangular shaped visual indicator pattern, the analyzer 134 determines the width and height of that rectangle. Similarly, when the RFID reader 120 uses a circular shaped visual indicator pattern, the analyzer 134 determines the radius of that circle.

The dimension of the visual indicator at the position of the candidate object is determined by some function of the distance to the candidate object and the RFID reader's capabilities, such as, but not limited to, configured power output, possibly some environmental conditions, or a combination thereof. The environmental conditions may include, but not limited to, temperature and humidity etc. The controller 126 calibrates the range indicator 132 based on the result of the analysis. The range indicator 132 may directly communicate with the distance meter 130 for this operation.

The range indicator 132 is calibrated based on the measured distance and the current range of the RFID reader 120. For example, depending on the distance, the candidate object may be completely illuminated or not be illuminated. The dimension of the visual indicator may be changed due to the read range changes during operation of the RFID reader 120.

The range indicator 132 includes a multi-dimension projector for projecting the multi-dimensional illumination. The multi-dimension projector may be, but not limited to, an IR emitter, a laser light emitter, an array of LEDs etc. The range indicator 132 may include, for example, a 2-dimensinoal projector for providing a 2-dimensional visual image (e.g., rectangular image). The range indicator 132 may utilize a multi-dimensional barcode scanner technique to project a multi-dimensional illumination pattern (i.e., visual indicator) on the candidate object. The 2-dimensional projector may include a projecting module of a 2-dimensional barcode scanner, which quickly provides a laser both vertically and horizontally to display the illumination pattern. The range indicator 132 may include a source for the visual indicators, which may, but not limited to, a laser, halogen, LED. The range indicator 132 may be a multicolor projector that changes color based on the analysis.

The range indicator 132 may further include a feedback device for providing feedback to user, other than visual indicators. The feedback device may include, but not limited to, a device for generating audible signals (e.g., beep), a device for generating readable message on a display (e.g., 152 of FIG. 3), and a device for generating vibrations. The sound device may include, but not limited to, a buzzer, speaker or other simple audible output device. The feedback device operates when the candidate object is outside the range of the RFID reader 120. However, the feedback device may provide the indicator when the candidate object is within the range of the RFID reader 120. The feedback device may be included in any elements of the RFID reader 120 other than the range indicator 132. The external device 142 may include the feedback device.

Figure 3:
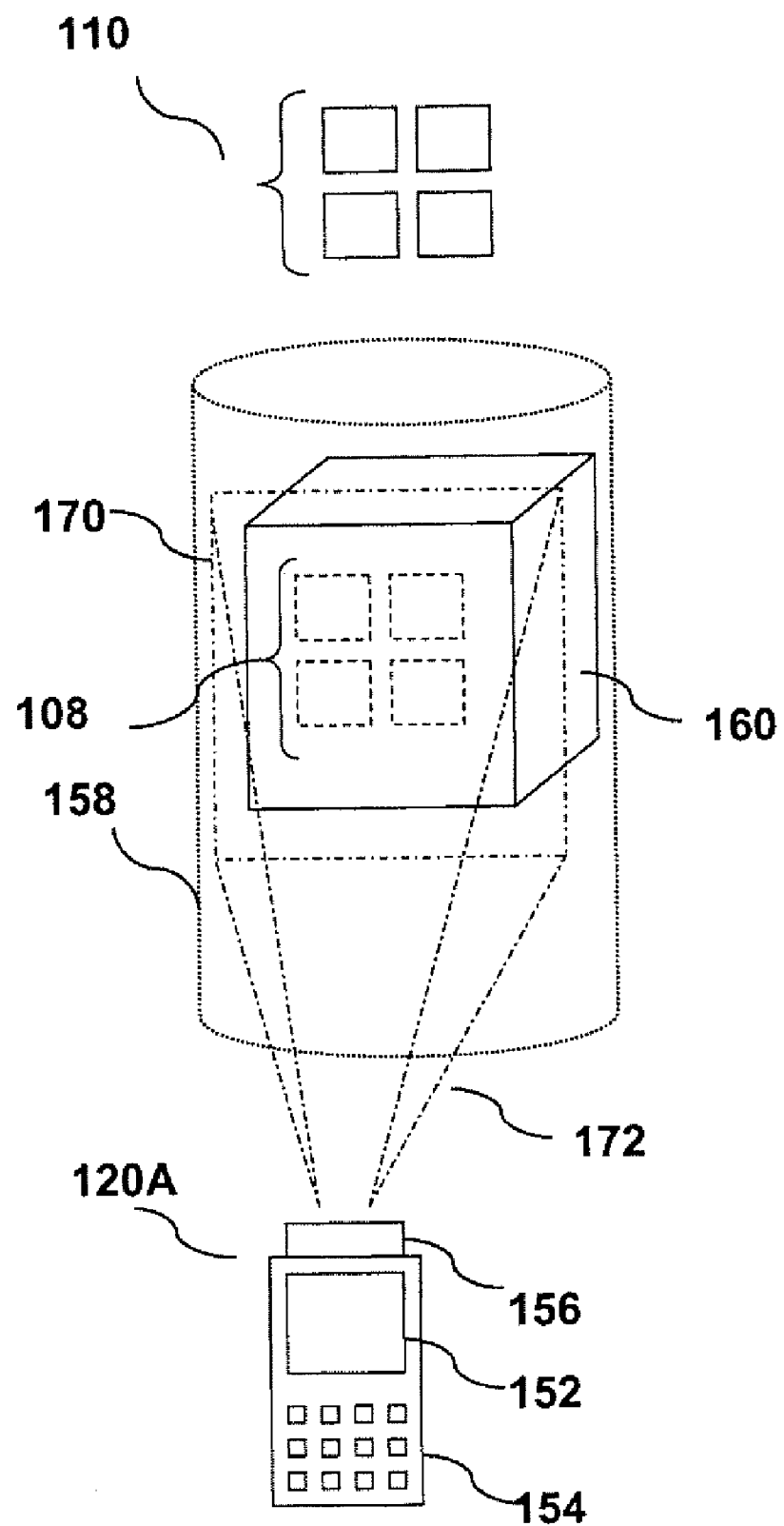
FIG. 3 is a schematic diagram illustrating an example of a visual indicator provided by the RFID reader.

FIG. 3 illustrates an example of a visual indicator provided by the RFID reader. The RFID reader 120A of FIG. 3 is same or similar to the RFID reader 120 of FIG. 2, and includes the distance meter 130 and the range indicator 132 of FIG. 2. The RFID reader 120A includes a display 152 for displaying visual information on a screen, a plurality of keypads 154 for inputting information into the RFID reader 120A, and a projector device 156. The projector device 156 is an element of the range indicator 132. In FIG. 3, "158" represents an envelope of the RFID coverage. The shape of the envelope 158 is representational only and is not limited to that shown in FIG. 3. In FIG. 3, "170" represents a visual indicator at the position of a candidate object 160, and is associated with the envelope 158 of the RFID coverage. In FIG. 3, "172" represents an illumination for the visual indicator 170, and is projected from the RFID reader 120A. The illumination 172 may be visible and may be a visual indicator.

In this example, the RFID reader 120A determines that the candidate container 160 is within the range of the RFID reader 120A, and illuminates a 2-dimensional area on the surface of the candidate container 160 by the visual indicator 170.

For example, as shown in FIG. 3, if the candidate container 160 is completely illuminated, the user of the RFID reader 120A can determine that most or all tags contained within the container 160 will be read. Further, the visual indicator 170 or the illumination 172 provides an indication on whether any possible tags within the area between the RFID reader 120A and the candidate object 160 will be properly readable. The user may determine that any tags within the distance to the candidate object 160 are not positioned for proper operation of the RFID reader 120A by reviewing the visual indicator 170 or illumination 172.

Figure 4:
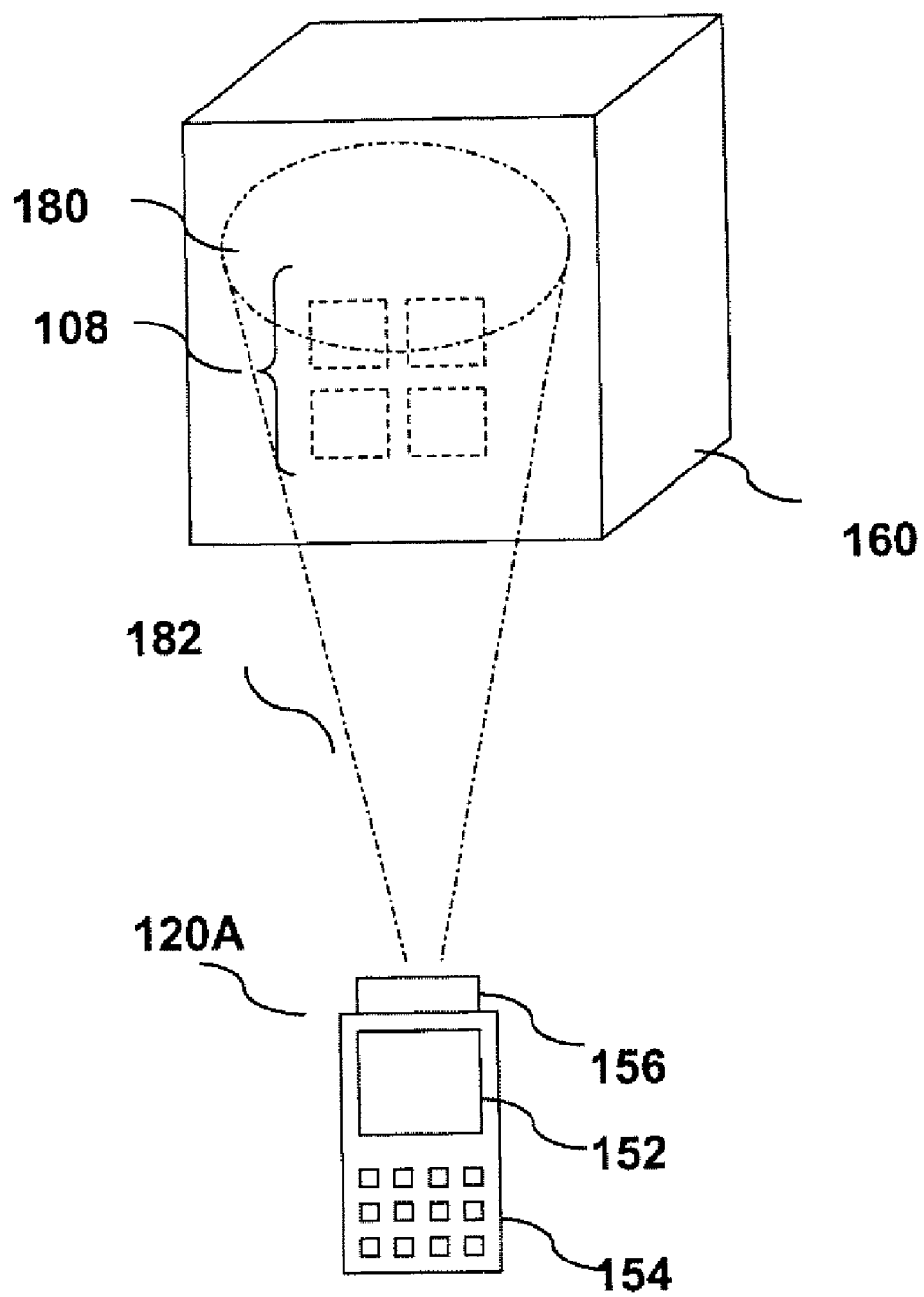
FIG. 4 is a diagram illustrating another example of the visual indicator provided by the RFID reader.

FIG. 4 illustrates another example of the visual indicator on the candidate object provided by the RFID reader 120A. In FIG. 4, "180" represents an illuminated area on the candidate object 160 and also represents the visual indicator on the candidate object 160, both of which are associated with the envelope (not shown) of the RFID coverage. In FIG. 4, "182" represents an illumination for the visual indicator 180, and is projected from the RFID reader 120A. The illumination 182 may be visible and may be a visual indicator.

In this example, an upper area in one surface of the candidate container 160 is illuminated. Thus, the upper area of the candidate container 160 is in the range of the RFID reader 120A, and the lower area of the candidate container 160 is not in the range of the RFID reader 120A. Any tags in the lower area of the candidate container 160 will not be readable.

Further, the visual indicator 180 or the illumination 182 provides an indication on whether any possible tags within the area between the RFID reader 120A and the candidate object 160 will be properly readable. The user may determine that any tags within the distance to the candidate object 160 are not positioned for proper operation of the RFID reader 120A by reviewing the visual indicator 180 or the illumination 182.

In FIGS. 3-4, one surface of the candidate container 160 is partially or entirely illuminated. However, if the candidate container 160 is not illuminated, the user of the RFID reader 120A can determine that the container 160, the RFID reader 120A, possible tags within the container 160 are not positioned for proper interrogation, read, or write operation of the RFID reader 120A.

Figure 5:
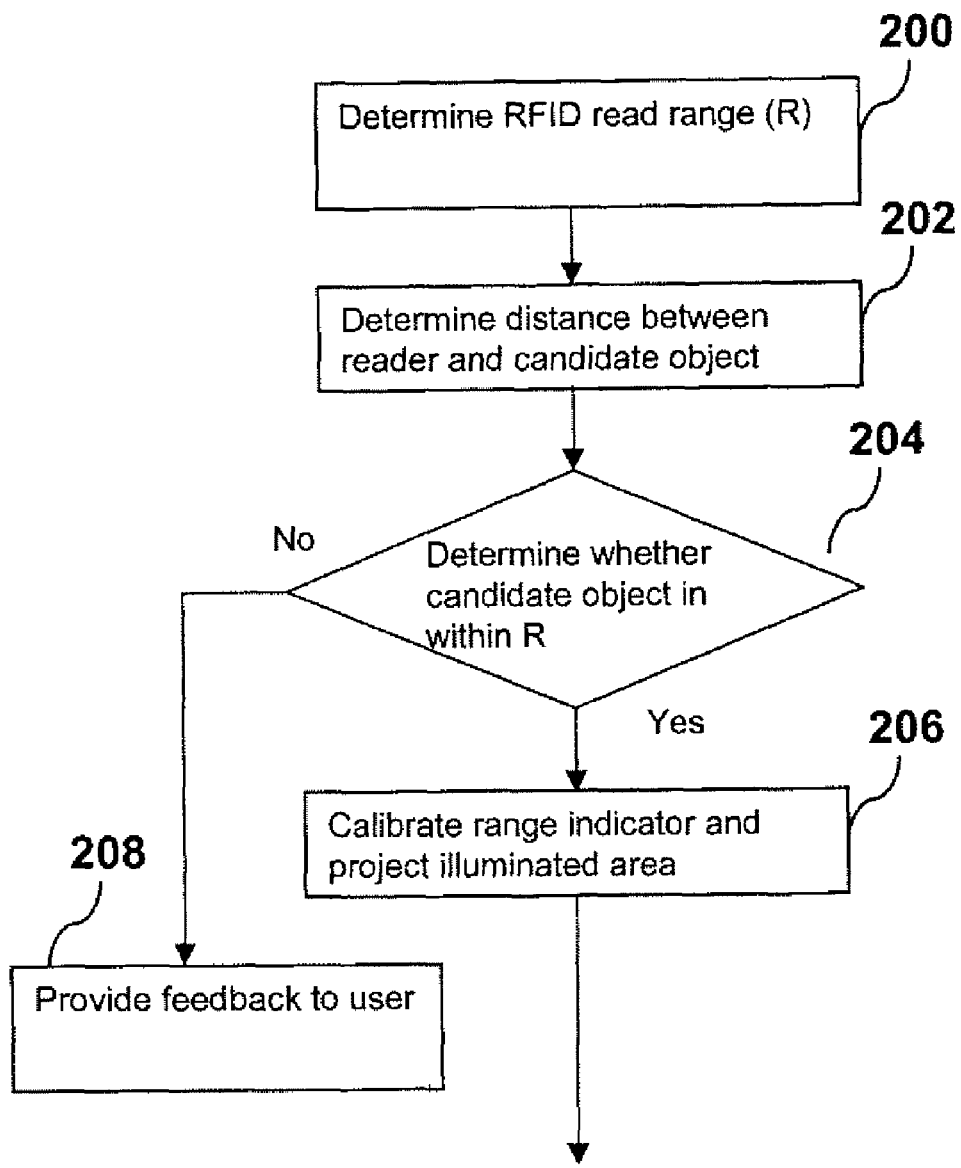
FIG. 5 is a flowchart illustrating the method of operating the RFID reader in accordance with an embodiment of the present invention.

FIG. 5 illustrates an example of the method of operating the RFID reader in accordance with an embodiment of the present invention. At step 200, the read range R of the RFID reader (e.g., 120 of FIG. 2, 120A of FIGS. 3-4) is determined. At step 202, a distance between the RFID reader and a candidate object (e.g., container, box) is determined (130 of FIG. 2). At step 204, it is determined whether the candidate object is within the read range R of the RFID reader. At step 204, the dimension of an illuminated area is also determined. If the candidate object is within the read range R of the RFID reader, the range indicator (132 of FIG. 2) is calibrated, and projects the illuminated area at step 206. If the candidate object is not within the read range R of the RFID reader, a user receives a feedback (step 208), such as beep, readable message, or indicator led.

In FIG. 5, the step of determining the read range R of the RFID reader (step 202) is implemented after the step of determining the distance to the candidate object (step 202). However, the step 202 may is implemented prior to step 200. As described above, the range R of the RFID reader may be determined in parallel to the distance measurement or separately from the distance measurement.

According to the above embodiments, the user of the RFID reader can determine that a candidate object which may have tags are located within the range of the RFID reader for proper interrogation, read or write operation. In dependence upon the visual indicator, the user can relocate the RFID reader or objects that may contain tags.

The above embodiments are described using the candidate object containing possible tags. However, in a further embodiment, tags may be attached to the surface of the candidate object.

In a further embodiment, the candidate object is a tag itself or a group of tags. In this embodiment, the visual indicator provides to a user an indication that the tag or the group of tags are within the range of the RFID reader and are properly read by the RFID reader.

The above embodiments of the invention may be implemented in one or any combination of hardware, firmware, and software. The invention may also be implemented as instructions contained in or on a machine-readable medium, which may be read and executed by one or more processors to perform the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The present invention has been described with regard to one or more embodiments. However, it will be apparent to persons skilled in the art that a number of variations and modifications can be made without departing from the scope of the invention as defined in the claims.

What is claimed is:

1. A Radio Frequency Identifier (RFID) reader, comprising:
   an RF antenna for communicating with at least one tag using RF signals;
   a range indicator for projecting a visual indicator associated with a coverage area of the RF antenna at a position of a target object when the target object is within a range of the RFID reader; and
   a controller for calibrating the range indicator based on the position of the target object and the range of the RFID reader when the target object is within the range of the RFID reader.

2. An RFID reader as claimed in claim 1, wherein the controller comprises:
   an analyzer for analyzing the coverage area of the RF antenna at the position of the target object.

3. An RFID reader as claimed in claim 2, wherein the visual indicator comprises:
   a multi-dimensional visual indicator calibrated based on the coverage area of the RF antenna at the position of the target object.

4. An RFID reader as claimed in claim 1, wherein the controller determines at least one dimension of the visual indicator.

5. An RFID reader as claimed in claim 4, wherein the controller analyzes the coverage area of the RF antenna at the position of the target object, and determines the at least one dimension of the visual indicator, based on the coverage area of the RF antenna at the position of the target object.

6. An RFID reader as claimed in claim 1, wherein the controller comprises an analyzer for determining, based on the position of the target object and the range of the RFID reader, whether the target object is within the range of the RFID reader, and wherein the range indicator projects the visual indicator on the target object only when it is determined that the target object is within the range of the RFID reader.

7. An RFID reader as claimed in claim 1, wherein the visual indicator comprises a multi-dimensional visual pattern.

8. An RFID reader as claimed in claim 1, wherein the controller comprises:
an analyzer for analyzing distance to the target object and the range of the RFID reader.

9. An RFID reader as claimed in claim 8, comprising:
a module for measuring the distance between the target object and the RFID reader.

10. An RFID reader as claimed in claim 8, wherein the analyzer determines whether the target object is within the range of the RFID reader to enable the range indicator.

11. An RFID reader as claimed in claim 1, wherein at least one dimension of the coverage area of the RF antenna at the position of the target object is determined based on a function of the range of the RFID reader with a distance to the target object.

12. An RFID reader as claimed in claim 11, wherein the at least one dimension of the coverage area is determined based on a function of the distance to the target object and power output.

13. An RFID reader as claimed in claim 11, wherein the at least one dimension of the coverage area is determined based on a function of the distance to the target object, power output, and at least one environmental condition factor.

14. An RFID reader as claimed in claim 1, comprising:
a feedback device for providing feedback to the user of the RFID reader when the controller determines that the target object is outside the range of the RFID reader.

15. A method for a Radio Frequency Identifier (RFID) reader, the RFID reader including an RF antenna for communicating with a tag using RF signals, the method comprising the steps of:
analyzing a range of the RFID reader and a position of a target object and calibrating a range indicator based on the position and the range of the RFID reader when the target object is within the range of the RFID reader; and
projecting from the range indicator a visual indicator associating with the coverage area of the RF antenna at the position of the target object when the target object is within the range of the RFID reader.

16. A method as claimed in claim 15, wherein the step of analyzing comprises:
measuring a distance to the target object; and
determining the coverage area of the RF antenna at the position of the target object.

17. A method as claimed in claim 15, wherein the visual indicator comprises a multi-dimensional visual indicator and wherein the step of calibrating comprises calibrating the multi-dimensional visual indicator based on coverage area of the RF antenna at the position of the target object.

18. A method as claimed in claim 15, wherein the step of analyzing comprises:
determining at least one dimension of the visual indicator.

19. A method as claimed in claim 18, wherein the step of analyzing comprises:
analyzing the coverage area of the RF antenna at the position of the target object; and
determining the at least one dimension of the visual indicator, based on the coverage area of the RF antenna at the position of the target object.

20. A method as claimed in claim 15, wherein the step of analyzing comprises:
determining, based on the position of the target object and the range of the RFID reader, whether the target object is within the range of the RFID reader, and wherein
the step of projecting illuminates the visual indicator only when it is determined that the target object is within the range of the RFID reader.

21. A method as claimed in claim 15, wherein the step of projecting comprises projecting the visual indicator having a multi-dimensional pattern.

22. A method as claimed in claim 15, wherein the step of analyzing comprises:
analyzing a distance to the target object and the range of the RFID reader.

23. A method as claimed in claim 22, comprising:
measuring the distance between the target object and the RFID reader.

24. A method as claimed in claim 15, wherein the step of analyzing comprises:
determining at least one dimension of the visual indicator based on a function of the range of the RFID reader with a distance to the target object.

25. A method as claimed in claim 24, wherein the step of determining comprises:
determining the at least one dimension of the visual indicator based on a function of the distance to the target object and power output.

26. A method as claimed in claim 24, wherein the step of determining comprises:
determining the at least one dimension of the visual indicator based on a function of the distance to the target object, power output, and at least one environmental condition factor.

27. A method as claimed in claim 15, comprising:
providing feedback to the user of the RFID reader when the controller determines that the target object is outside the range of the RFID reader.

28. A method as claimed in claim 15, wherein the step of analyzing comprises:
determining whether the target object is within the range of the RFID reader, and
enabling the step of projecting when the target object is within the range of the RFID reader.

* * * * *

UNITED STATES PATENT AND TRADEMARK OFFICE
CERTIFICATE OF CORRECTION

PATENT NO. : 7,786,865 B2  
APPLICATION NO. : 11/466596  
DATED : August 31, 2010  
INVENTOR(S) : Park Page 1 of 1

It is certified that error appears in the above-identified patent and that said Letters Patent is hereby corrected as shown below:

Title Page, Item (57), under "ABSTRACT", in Column 2, Line 5, delete "reader;" and insert -- reader, --, therefor.

In the Specifications:

In Column 3, Line 3, delete "(ASIC)," and insert -- (ASICs), --, therefor.

In Column 3, Line 12, delete "(EROPM)," and insert -- (EPROM), --, therefor.

In Column 4, Line 18, delete "2-dimensinoal" and insert -- 2-dimensional --, therefor.

In the Claims:

In Column 7, Line 9, in Claim 8, delete "distance" and insert -- a distance --, therefor.

In Column 7, Line 54, in Claim 17, delete "coverage" and insert -- the coverage --, therefor.

Signed and Sealed this  
Thirtieth Day of April, 2013

Teresa Stanek Rea  
*Acting Director of the United States Patent and Trademark Office*